United States Patent

[11] 3,585,523

[72] Inventors William H. Glenn
 Vernon, Conn.;
 David A. Stetser, Jr., Bethany, Ohio
[21] Appl. No. 738,217
[22] Filed June 19, 1968
[45] Patented June 15, 1971
[73] Assignee United Aircraft Corporation
 East Hartford, Conn.

[54] SPHERICAL MIRROR CAVITY FOR MODE-LOCKED LASER
 1 Claim, 3 Drawing Figs.
[52] U.S. Cl. .................................................. 331/94.5,
 356/112
[51] Int. Cl. ............................................. H01s 3/00
[50] Field of Search ........................................ 331/94.5;
 356/106, 112

[56] References Cited
OTHER REFERENCES

" Off-Axis Paths in Spherical Mirror Interferometers"; Herriott et al.; APPLIED OPTICS: April 1964; Vol 3 #4 pg. 523−526

" Folded Optical Delay Lines", Herriott et al.; APPLIED OPTICS; August 1965; Vol. 4 08; pg. 883− 889

" Self Mode-Locking of Lasers with Saturable Absorbers";
De Maria et al.: APPLIED PHYSICS LETTERS: Vol 3 #7;
1 April 66 174− 176

" Single Transverse & Longitudinal Mode Q-Switched Ruby Laser" , Daneu et al. IEEE TOUR OF QUANTUM ELECTRONICS Vol QE2, #8; Aug. 1966; pg. 290−293.

Primary Examiner—Ronald L. Wibert
Assistant Examiner—V. P. McGraw
Attorney—Donald F. Bradley ABSTRACT: A spherical mirror interferometer cavity for a mode-locked laser for increasing feedback path length and therefore the time between consecutive mode-locked pulses. In one embodiment a laser rod and a mode-locking dye cell are inserted within an interferometer cavity comprising two spherical mirrors. In another embodiment a spherical mirror optical delay line is inserted within the interferometer cavity of a mode-locked laser, and the laser pulses are injected into the delay line.

PATENTED JUN 15 1971 3,585,523
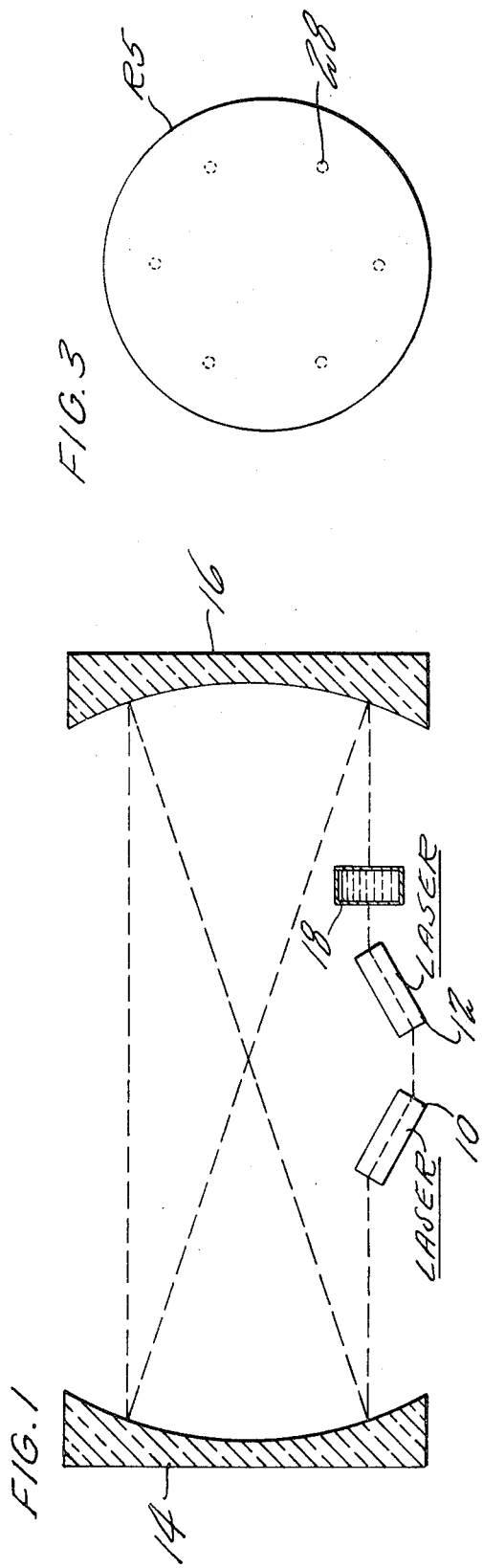
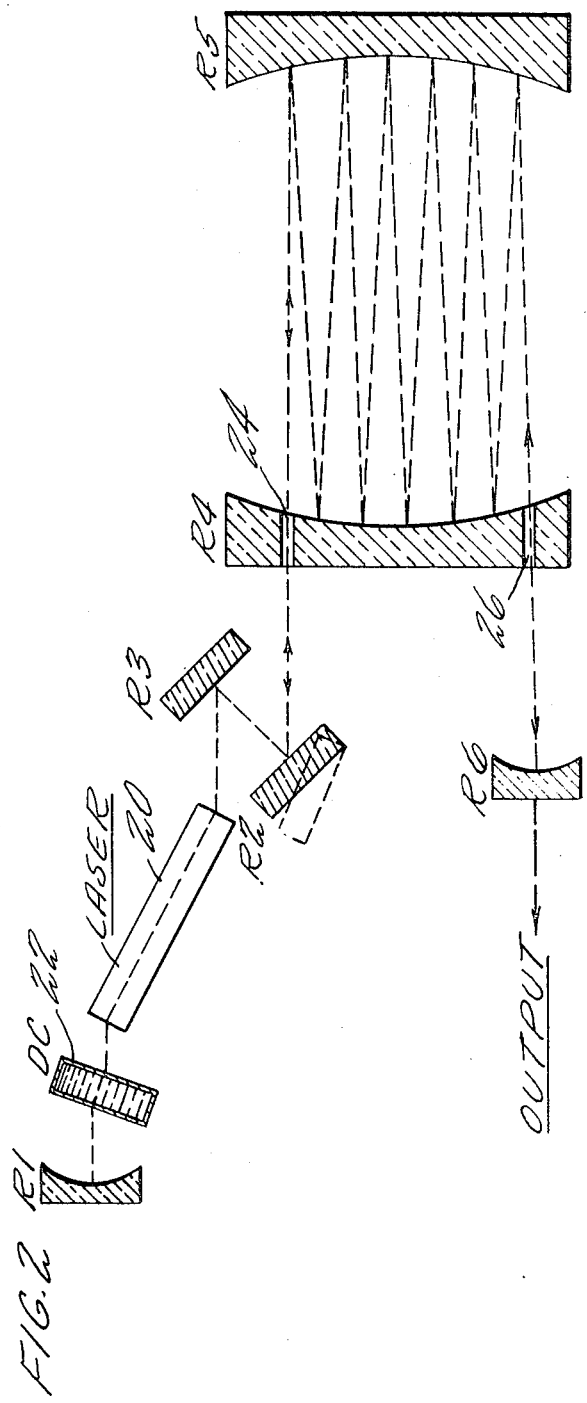
INVENTORS
WILLIAM H. GLENN
DAVID A. STETSER, JR.
BY Donald F. Bradley
ATTORNEY

SPHERICAL MIRROR CAVITY FOR MODE-LOCKED LASER

BACKGROUND OF THE INVENTION

It is well known that the output of a laser which has been mode-locked with a saturable absorber having a relaxation time less than the optical transit time of the laser interferometer cavity consists of a train of pulses separated by the cavity transit time. The transit time, $\tau$, is equal to $2D/c$ where D is the optical distance between the mirrors of the cavity and $c$ is the velocity of light. In most applications $\tau$ ranges between 3 and 10 nanoseconds.

In numerous applications longer intervals between pulses are desirable: for example, in acoustics or microwave generation where ultrashort light pulses are used to generate ultrashort acoustic or microwave pulses; in spectroscopy where the pulses are used to measure fluorescence or absorption lifetimes; in photography where the pulses are used to illuminate a rapidly moving event; and in nonlinear optics where the pulses are used to study self-induced transparency, photon echoes or plasma generation. Other applications are also readily apparent.

Although it is possible to switch the laser fast enough to separate out one pulse, it is difficult to do so. A more practical approach to obtain a longer delay between mode-locked pulses is to lengthen the optical path. A longer repetition rate also allows sufficient time between pulses to observe single pulse effects in various applications. The direct physical lengthening of a normal cavity is not practical because it introduces losses, causes alignment problems and increases degradation of the mode-locking process.

This invention overcomes the disadvantages of the prior art and provides an improved apparatus for obtaining a longer delay between mode-locked pulses.

SUMMARY OF THE INVENTION

In accordance with one embodiment of this invention, a laser and mode-locking dye cell are positioned within an optical interferometer cavity comprising two spherical mirrors. The positioning of the laser and geometry of the spherical mirrors will cause repetitive reflections between the spherical mirrors for each laser pulse, and the number and angle of the reflections and the total length of the optical path may be varied.

In accordance with another embodiment of this invention, an optical delay line consisting of two spherical mirrors is positioned in the laser interferometer cavity, and the mode-locked laser pulse is inserted into the optical delay line through a slot in one of the mirrors. The laser pulse is then circulated through the delay line for a time dependent on the design of the mirrors and the angle of insertion, and removed from the delay line through a slot. The delay time may also be varied.

An incidental advantage of both of the above systems is that the pulse circulation back and forth between the two spherical mirrors can be programmed to trace out a circular or linear scan pattern on one or both cavity mirrors, which scan pattern may be utilized independently of the delay between consecutive pulses.

It is therefore an object of this invention to provide apparatus for increasing the feedback path length and therefore the time between consecutive mode-locked laser pulses.

Another object of this invention is an optical delay line for laser pulses comprising spherical mirrors inserted into the laser interferometer cavity.

A further object of this invention is an optical interferometer cavity for mode-locked laser pulses comprising a pair of spherical mirrors.

Another object of this invention is apparatus for generating a predetermined scanning pattern for laser pulses utilizing a pair of spherical mirrors.

DESCRIPTION OF THE DRAWINGS

FIG. 1 shows schematically a laser element and a dye cell positioned in a interferometer cavity comprising two spherical mirrors.

FIG. 2 shows schematically an optical delay line comprising two spherical mirrors inserted within the interferometer cavity of a mode-locked laser.

FIG. 3 shows schematically a circular scan pattern generated on the surface of one of the spherical mirrors.

DESCRIPTION OF THE PREFERRED EMBODIMENTS

Laser oscillators generally consist of a resonant system with dimensions that are large when compared with the wavelength of oscillation of the laser.

As a result, mode density is high. The number of axial interferometer resonances across the line width of a laser transition is directly proportional to the optical path length and the line width, and inversely proportional to the square of the center wavelength. If the laser is internally amplitude modulated at a frequency equal to some multiple of the axial mode-spacing frequency, the axial resonance modes couple with a well-defined amplitude and phase. Mode-locking of the axial modes increases peak power by a large factor. Narrow width, high peak power, coherent optical pulses are produced by mode-locking.

Mode-locking results from the superposition of the upper and lower sidebands of the amplitude modulated light beam with the resonances of the interferometer. The constructive and destructive interference of the simultaneous phase-locked oscillations is analogous to the interference of Fourier series components in the construction of a repetitive pulse train. The period of the laser's pulsation is inversely proportional to the modulation frequency, and the peak power of the pulses is equal to the number of axial interferometer resonances multiplied by the average power.

A saturable absorber placed within the path of the laser beam will automatically produce mode-locking without the necessity of adjusting mirror spacing, modulating the frequency, adjusting laser cavity Q, varying the laser position, or compensating for any perturbations affecting the optical length of the feedback interferometer. Any medium exhibiting saturable absorption at the laser wavelength will serve as an optical expander element if the relaxation time of the absorber is faster than the optical transit time of the laser interferometer cavity. An optical saturable absorber is a solid, liquid or gas in which light radiation is selectively absorbed until an equalized population is produces within the absorber and the optical radiation impinging thereon is selectively passed. Typical examples of saturable absorbers are Eastman Kodak 9740 Q-switch solution operating at a wavelength of 1.06 microns, and cryptocyanine in methanol operating at 0.6943 microns. When used as a absorber, the dye is contained in an optically transparent enclosure and placed within the Fabry-Perot cavity in the path of the laser beam.

Referring to FIG. 1, there is shown a laser interferometer cavity comprising a pair of laser rods 10 and 12 positioned in a laser cavity consisting of spherical mirrors 14 and 16. The laser rods 10 and 12 are positioned at the Brewster angle with respect to the angle of incidence of the laser feedback radiation upon the laser rods. Also positioned in the path of the laser feedback radiation is a dye cell 18. The laser media 10 and 12 react as a single laser rod, the rod being cut in half and positioned at the Brewster angle to eliminate mode selection due to the reflections from the parallel surfaces of the laser.

The laser rods or laser media may be any type of well-known laser such as ruby, glass, helium-neon or carbon dioxide.

When the laser rods are actuated such as by a flash lamp or other pumping apparatus (not shown), a laser output will be generated within the laser rods. If the laser rods are properly positioned between the two mirrors 14 and 16, the laser radiation will be reflected from each mirror in a closed path which will eventually reintersect the laser rods. The dye cell 18 positioned in the path of the laser feedback radiation will produce mode-locking.

If the mirrors 14 and 16 are perfectly spherical, the points at which the laser radiation intersects each spherical mirror will trace out a three-dimensional figure such as a circle, ellipse or even a straight line. The geometric pattern may be varied by changing the position and angle of the laser medium within the cavity. The reflections will trace a path which lies on the surface of a hyperbolid. Generally an ellipse will be produced, but the ellipse may degenerate into a circle or straight line with the points of reflection displaced after each round trip of the laser feedback radiation. For certain configurations, the feedback radiation or ray will retrace its path and give rise to additional resonances for the interferometer. Preferable configurations are those in which the ray is reentrant and retraces its path after a fixed number of return trips. A closed path is shown in FIG. 1.

A longer pulse repetition time may be obtained by inserting a spherical mirror optical delay line within the cavity of a mode-locked laser. This effectively increases D, the optical distance between the cavity mirrors. In addition, the use of such a delay line as part of the laser's feedback cavity produces a nonmechanical digital scan of the pulsed laser output.

Referring to FIG. 2, a laser element such as a Brewster-end glass rod 20 is inserted in a feedback cavity consisting of coated mirrors R1 and R6. A dye cell 22 is positioned in the laser feedback path, the dye cell containing a dye such as Eastman Kodak 9740.

Also inserted in the laser feedback path are a pair of mirrors R3 and R2, and spherical mirror optical delay line comprising mirrors R4 and R5. Mirrors R3 and R2 are positioned so that the radiation from laser 20 will be injected into the optical delay line through an aperture in mirror R4 at the proper slope so that the repeated reflections in the optical delay line will trace out a circle on the surfaces of mirrors R4 and R5.

In FIG. 2 the radius of curvature of spherical mirrors R4 and R5, and the slope of the light beam selected by angular adjustment of mirror Rz are so chosen that the light beam makes six round trips between mirrors R4 and R5, and the trajectory traces out a six-spot circular pattern on each mirror of the delay line.

After the twelfth pass, the light beam passes through another exit aperture 26 in mirror R4. The light beam is then reflected back from mirror R6 through the delay line for another 12 traversals within the delay line, back through aperture 24 and mirrors R2 and R3 to laser 20.

For most efficient operation, all of the mirrors except either mirror R6 or R1 should have a reflectivity close to 100 percent, while the mirror R6 from which the output is taken preferably has a reflectivity of about 98 percent.

FIG. 2 thus demonstrates that long optical paths can be made compact by repeatedly reflecting the beam between two spherical mirrors without interference between adjacent beams. The diffraction losses of such a delay line are much lower than for an open beam because of the periodic focusing of the spherical mirrors R4 and R5.

It is apparent that mirrors R2 and R3 can be eliminated if the path of the light beam is such that it will proceed through aperture 24 at the proper angle. It is also apparent that the precise shape and radius of curvature of spherical mirrors R4 and R5, and the angle of incidence of the laser beam, can be varied to produce a preselected number of reflections of the beam within the delay line cavity, and that the pattern of the repeated reflections on mirrors R4 and R5 can be varied.

FIG. 3 shows the circular pattern of the laser beam reflections on mirror R5. The time interval between reflections will correspond to the time required for a light pulse to make the round trip between mirrors R4 and R5. After each series of six pulses, there will be a slight delay as the pulse leaves the cavity and is reflected from mirror R6 back into the cavity, and then another series of six spots is generated. The group of 12 spots will be separated by a time interval corresponding to the time required for a light pulse to make a round trip between mirrors R1 and R6.

The amplitude of the pulses which impinge upon the mirror R5 and shown as spots 28 in FIG. 3, decay exponentially as a function of time. The reason for this is that each pulse will lose a very small percentage of this amplitude as it strikes each mirror because of the practical impossibility of providing each mirror with 100 percent reflectivity. Thus the spots shown in FIG. 3 will show a decrease in amplitude and the second series of six spots or pulses will also show a decreasing amplitude lower than the first series of six spots. Other variations may be noticed due to imperfections in the coating of the mirrors.

One of the important properties of the cavities shown in FIGS. 1 and 2 is that they allow temporal and spatial resolution of the short optical pulses. Typical applications are the self-production of a spot raster, upon which an image could be condensed and projected upon a collimated laser beam and subsequently detected by similar passive interferometer acting as a matched filter. A further use would be an optical pulse coding technique by spatial selection of the pulses to be included in the output. By an appropriately perforated mask, any desired coding could be imposed on the pulse train. In addition, the spatially separated pulses could be used as the basis for a counting system.

It is apparent that other configurations of the mode-locked laser beam positioned in a cavity comprising two spherical mirrors may be constructed by those skilled in the art. The invention is to be limited and defined only as set forth in the following claims.

We claim:

1. Apparatus for increasing the optical path length within the laser feedback cavity of a mode-locked laser comprising:
   first and second spherical reflecting mirrors positioned to form an optical feedback cavity,
   a laser medium positioned in said optical feedback cavity between said mirrors, said mirrors and said laser medium being so arranged that the optical feedback radiation from said laser medium traverses a closed folded optical path and reintersects said laser medium after multiple reflections between said mirrors,
   and a saturable absorber positioned in the path of said optical feedback radiation for mode-locking said laser radiation.